ID [19] United States Patent
Seong et al.

[11] Patent Number: 6,016,558
[45] Date of Patent: Jan. 18, 2000

[54] COMMUNICATION EVENT/MESSAGE TRACING METHOD FOR RPC-BASED DISTRIBUTION PROCESSING PROGRAM

[75] Inventors: Myung Je Seong; Eun Jeong Lee; Yeong Wook Cho, all of Daejeon, Rep. of Korea

[73] Assignee: Electronics and Telecommunications Research Institute, Daejeon, Rep. of Korea

[21] Appl. No.: 09/006,905

[22] Filed: Jan. 14, 1998

[30] Foreign Application Priority Data

Dec. 9, 1997 [KR] Rep. of Korea ..................... 97-67117

[51] Int. Cl.$^7$ ..................................................... G06F 11/00
[52] U.S. Cl. ................................ 714/45; 714/34; 714/35; 714/20; 714/31
[58] Field of Search .................................. 714/20, 34, 35, 714/45, 31

[56] References Cited

U.S. PATENT DOCUMENTS 5,815,653  9/1998  You et al. .................................. 714/38
5,819,093  10/1998 Davidson et al. ....................... 395/704
5,933,639  8/1999  Meier et al. ............................. 395/704

*Primary Examiner*—Ayaz R. Sheikh
*Assistant Examiner*—Rupal D. Dharia
*Attorney, Agent, or Firm*—Antonelli, Terry, Stout & Kraus, LLP

[57] ABSTRACT

A communication event/message tracing method for an RPC-based distribution processing program which is capable of tracing an RPC communication between distribution processes in real time, judging a communication content, and debugging the distribution program. The method includes the steps of a first step in which a program and event list to be traced on an event tracing window of a debugging client is registered by a user and a debugging client reports the start of the event tracing to the debugging server in which a corresponding program exists; a second step in which the debugging servers reports a break point setting instruction to an event-related RPC library function to the rear debuffer in accordance with the report in the first step; a third step in which the rear debugger sets a break point with respect to the RPC library function of the program in accordance with the instruction of the second step and the result is reported to the debugging server; and a fourth step in which the debugging server reports to the debugging client that the event tracing operation is ready in accordance with the report of the third step.

3 Claims, 3 Drawing Sheets

COMMUNICATION EVENT/MESSAGE TRACING METHOD FOR RPC-BASED DISTRIBUTION PROCESSING PROGRAM

BACKGROUND OF THE INVENTION

1. Field of the Invention

The present invention relates to a communication event/message tracing method for an Remote Procedure Call)-based distribution processing program, and particularly, to an improved communication event/message tracing method for an RPC-based distribution processing program which is capable of tracing an RPC communication between distribution processes in real time, judging a communication content, and debugging a distribution program.

2. Description of the Conventional Art

There is a tool kit, so called RPC, for building distributed processing applications. RPC is typically provided as a set of library functions.

In order to obtain an information concerning an RPC communication generation, there is a TCPdump technique. This technique is directed to informing a communication generation between computers in a batch mode. However, it is impossible to trace that a program communicates with what program. In addition, the generation of the communication event is not detected in real time.

In addition, it is possible to recognize the generation of the communication event by manually setting a brake point in an RPC communication program using a sequential debugging operation; however, in the conventional art, since a single program is controlled, it is impossible to recognize an interrelationship between communication events.

SUMMARY OF THE INVENTION

Accordingly, it is an object of the present invention to provide a communication event/message tracing method for an RPC-based distribution processing program which overcomes the aforementioned problems encountered in the conventional art.

It is another object of the present invention to provide a communication event/message tracing method for an RPC-based distribution processing program which is capable of tracing an RPC communication between distribution processes in real time, judging a communication content, and debugging the distribution program.

To achieve the above objects, there is provided an improved communication event/message tracing method for an RPC-based distribution processing program according to the present invention which includes the steps of a first step in which a program and event list to be traced on an event tracing window of a debugging client is registered by a user and a debugging client reports the start of the event tracing to the debugging server in which a corresponding program exists; a second step in which the debugging servers reports a break point setting instruction to an event-related RPC library function to the rear debugger in accordance with the report in the first step; a third step in which the rear debugger sets a break point with respect to the RPC library function of the program in accordance with the instruction of the second step and the result is reported to the debugging server; a fourth step in which the debugging server reports to the debugging client that the event tracing operation is ready in accordance with the report of the third step; a fifth step in which the debugging client reports to the rear debugger through the debugging server so that the debugging client performs all programs related to the event tracing program in accordance with the report of the fourth step, and the rear debugger performs the program; a sixth step in which the ready debugger judges whether the rear debugger reaches the position where the break point is set during the operation of the program of the fifth step; a seventh step in which the fifth step is repeatedly performed when the break point does not reach the set position as a result of the judgement of the sixth step and the program is stopped at a corresponding position when the same reaches the set position, and the result thereof is reported to the debugging client through the debugging server; an eighth step in which the debugging client compares the break point with the event list in accordance with the report of the seventh step and judges whether the event is generated; and a ninth step in which the fifth step is repeatedly performed when the event is not generated as a result of the judgement of the eighth step and a receiving message and sending message of the sender and receiver are mapped when the event is generated, and the generation of the event is displayed on the event tracing window.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will now be explained with reference to the accompanying drawings.

Figure 1:
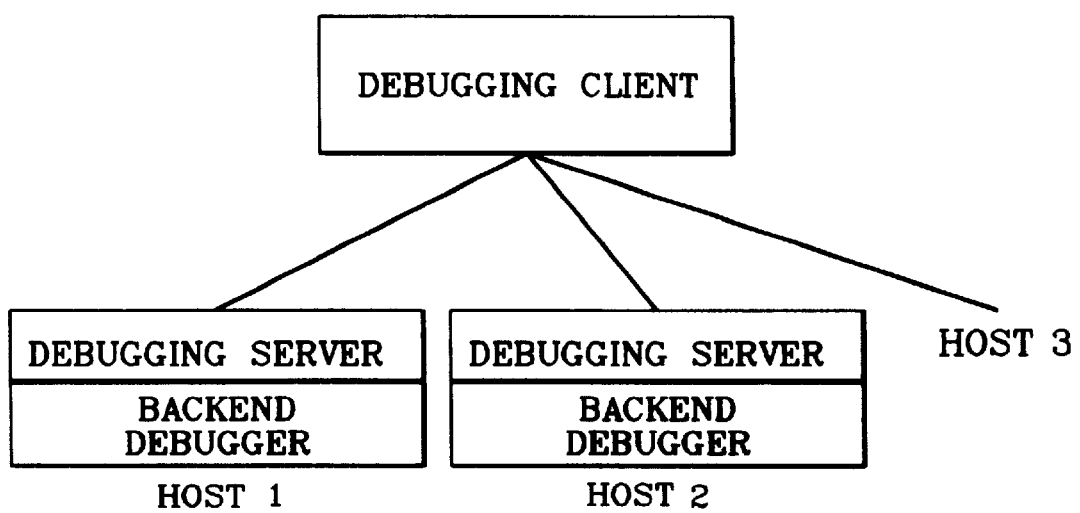
FIG. 1 is a view illustrating the construction of a distribution processing diagnosing/correcting apparatus according to the present invention.
Figure 2:
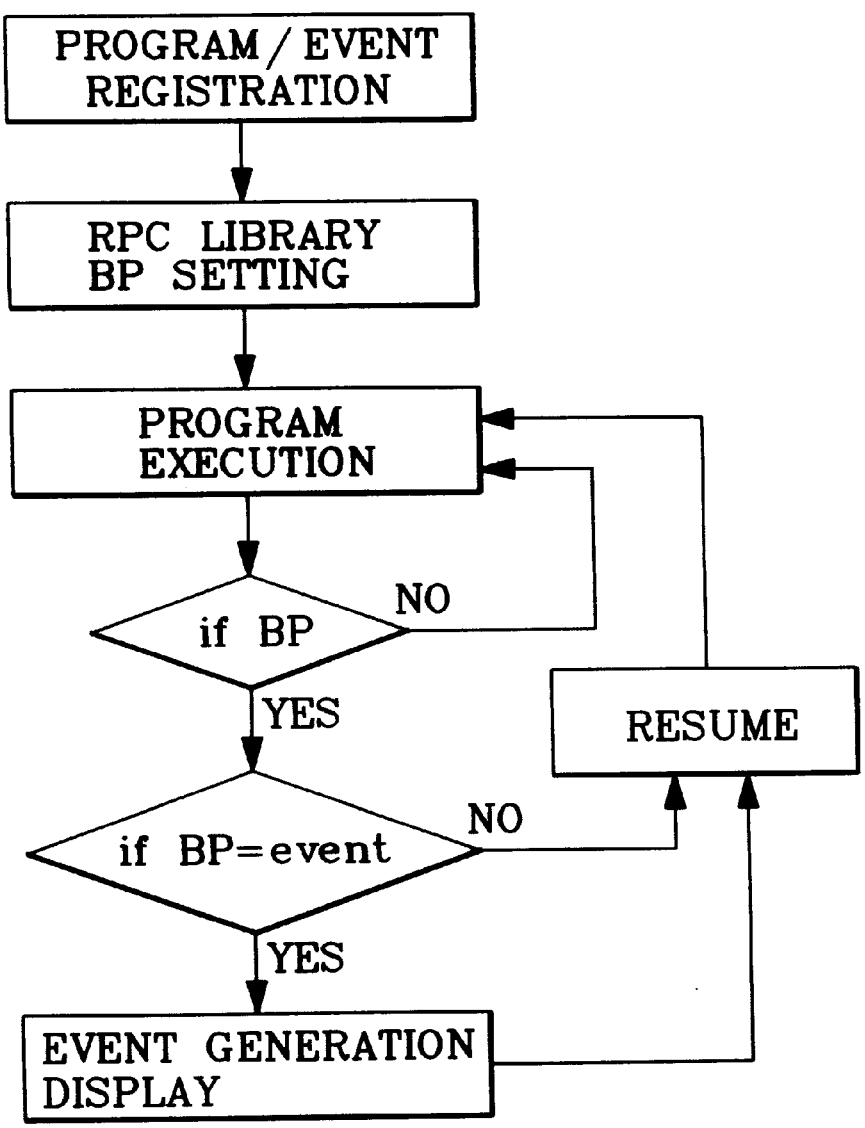
FIG. 2 is a flow chart illustrating a communication event/message tracing method for an RPC-based distribution processing program according to the present invention.
Figure 3:
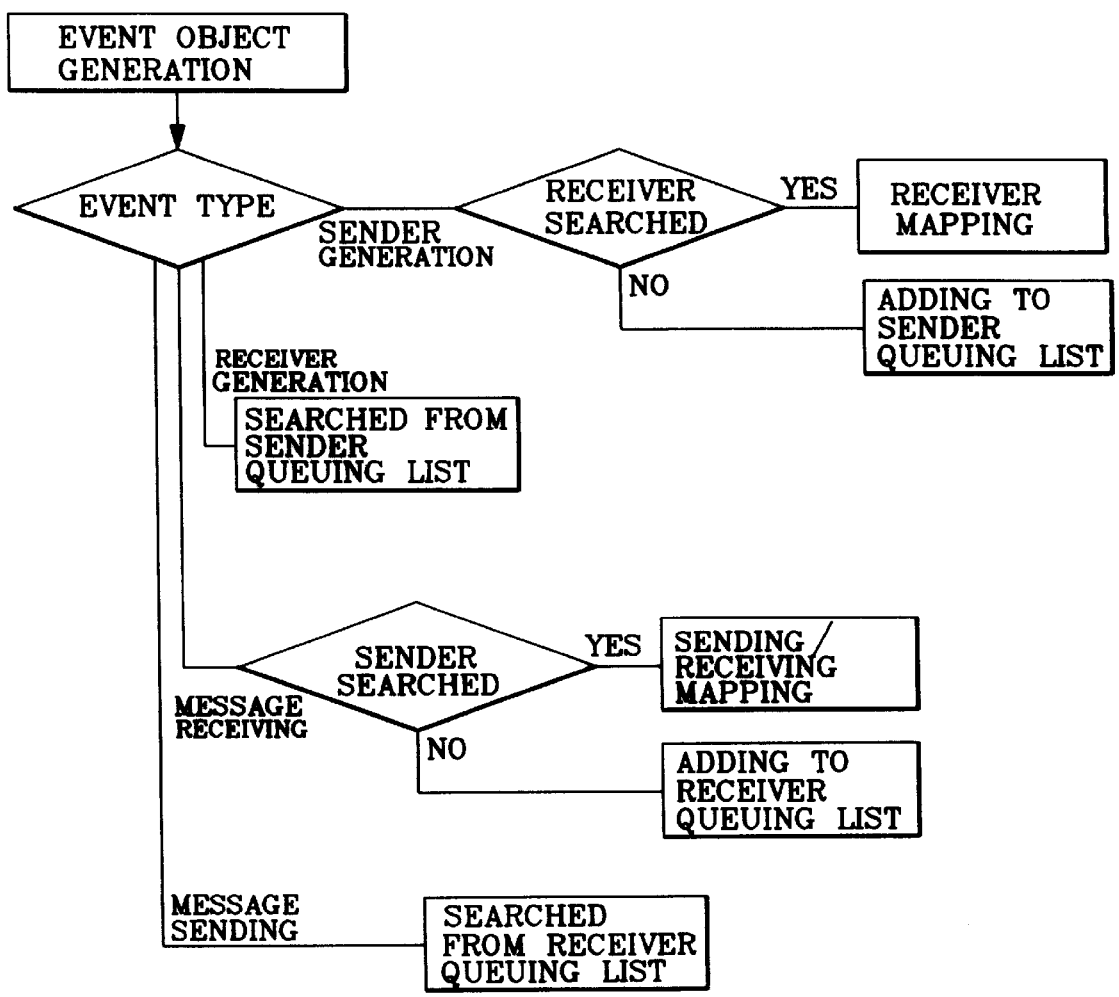
FIG. 3 is a flow chart illustrating a mapping method of a communication event generated by the method of FIG. 2.

First, FIG. 1 illustrates the construction of a distribution processing diagnosing/correcting apparatus according to the present invention, FIG. 2 illustrates a communication event/message tracing method for an RPC-based distribution processing program according to the present invention, and FIG. 3 illustrates a mapping method of a communication event generated by the method of FIG. 2.

By RPC communication, we refer a sequence of interactions between two (usually distributed) processes; the caller process initiates the communication by calling clnt_call(), providing the host address, calling procedure id and parameters, etc. This is transferred to the called process, resulting a call to the dispatch routine. The communication can be a synchronous call with replying the result promptly, or an asynchronous call without replying. In this invention, a set of library functions is used in order to model RPC communications. These consist a common part of RPC products and standards. The model of the invention can be extended to cover full set of RPC protocols generally.

As shown in FIG. 1, the distribution processing diagnosing/correcting apparatus according to the present invention includes a debugging client 100 for providing a graphic user interface concerning a communication event tracing operation to a user, debugging servers 2-1 through 2-N, each of which is connected with a corresponding one of first through N-th host computers 200-1 through 200-N of a distribution system, for converting a communication event tracing request from the debugging client 100 into a debugging instruction, and rear portion debuggers 12-1 through 12-N, more than one of which are connected with the first through Nth host computers 200-1 through 200-N of the distribution system, for debugging application programs of the first through N-th host computer 100-1 through 200-N.

As shown in FIG. 2, the communication event/message tracing method for an RPC-based distribution processing program according to the present invention includes a first step in which a program and event list to be traced on an event tracing window of a debugging client is registered by a user (S1) and a debugging client reports the start of the event tracing to the debugging server in which a corresponding program exists (S2), a second step in which the debugging servers reports a break point setting instruction to an event-related RPC library function to the rear debuffer in accordance with the report (S2) in the first step, a third step in which the rear debugger sets (S4) the break point with respect to the RPC library function of the program in accordance with the instruction (S3) of the second step and the result is reported to the debugging server, a fourth step in which the debugging server reports to the debugging client that the event tracing operation is ready in accordance with the report (S4) of the third step, a fifth step in which the debugging client reports to the rear debugger through the debugging server so that the debugging client performs all programs related to the event tracing program in accordance with the report (S5) of the fourth step, and the rear debugger performs the program, a sixth step in which the rear debugger judges whether the rear debugger reaches the position where the break point is set during the operation of the program (S6) of the fifth step, a seventh step in which the fifth step is repeatedly performed when the break point does not reach the set position as a result of the judgement (S7) of the sixth step and the program is stopped (S8) at a corresponding position when the same reaches the set position, and the result thereof is reported to the debugging client through the debugging server, an eighth step in which the debugging client compares the break point with the event list in accordance with the report (S8) of the seventh step and judges whether the event is generated, and a ninth step in which the fifth step is repeatedly performed when the event is not generated as a result of the judgement of the eighth step and a receiving message and sending message of the sender and receiver are mapped when the event is generated, and the generation of the event is displayed on the event tracing window.

In the ninth step, the debugging client includes a receiver and sender, a sending object queuing list for storing the sender arrived before the receiver is generated, and a receiving object queuing list for storing the receiving message before the same is transmitted.

As shown in FIG. 3, the mapping method of the debugging client of the ninth step includes a first step in which an event object is generated (S100), and the event type is judged (S101), a second step in which the receiver is searched when the event type is a sender generation as a result of the judgement (S101) of the first step, a third step in which the receiver is mapped (S103) when the receiver is being searched in the second step, and the sender generated in the first step is added (S104) to the sender queuing list (S104), a fourth step in which the sender is searched from the sender queuing list when the event type is the receiver generation as a result of the judgement (S101) of the first step, a fifth step in which the sender is searched (S106) when the event type is the message receiving as a result of the judgement (S101) of the first step, a sixth step in which the sending and receiving are mapped (S107) when the sender is not searched in the fifth step, and the message receiving generated in the first step is added (S108) to the receiver queuing list when the sender is not searched, and a seventh step in which the receiver is searched from the sender queuing list when the event type is the message sending as a result of the judgement of the first step.

The communication event/message tracing method for the RPC-based distribution processing program according to the present invention will now be explained in more detail with reference to the accompanying drawings.

First, for a communication between processes, a connection is implemented between the sending and receiving processes, and then a communication message is exchanged therebetween. Here, the operation that the connection is implemented between the sending and receiving processes and the communication message is transmitted and received is called a communication event.

In order to trace the communication event/message between the distribution processes in real time, the condition that the communication event took place in the process should be checked. In addition, for mapping the sending event and receiving event, it should be determined that the sending and receiving operation took place between two processes.

The RPC communication program uses an RPC library, and during the execution of the program, it is possible to judge the operation of the RPC library using the debugger. Therefore, it is possible to recognize the generation of the communication event and the data related with the communication.

The sequence that one communication is implemented in the RPC-based communication program is as follows: first, the receiver is generated, second, the sender is generated, third, the message is transmitted, and fourth, the message is received.

The receiver corresponds to the dispatcher routine of the server program, and is registered by svc_register RPC library function.

The sender corresponds to the client handle in the client program and is generated at every time when clnt_call RPC library function is called.

In addition, it is recognized that when the clnt_call RPC library function is performed by the client, the message is transmitted, and when the dispatch routine is performed by the server, the message is received.

The RPC-based communication according to the present invention will be explained in more detail with reference to FIG. 2.

First, in Step S1, a user registers a program and event list to be traced in the event tracing window of the debugging client.

In Step S2, the event tracing operation is reported to the debugging server in which a corresponding program exists.

In Step S3, the debugging server transfers a break point (BP) setting instruction to the RPC library function related with the event of the rear debugger.

In Step S4, the rear debugger provides the break point to the RPC library function of the program and reports the same to the debugging server.

In Step S5, the debugging server reports, to the debugging client, that the event tracing is ready.

In Step S6, the debugging client transfers to the rear debugger through the debugging server for performing all programs related with the event tracing.

In Step S7, the rear debugger stops the program at a corresponding position when the program execution reaches the position where the break point is set and reports the same to the debugger through the debugging server.

In Step S8, the debugging client compares the break point with the event list and judges whether the event occurred. When the event occurred, the following values are obtained from the rear debugger.

Receiver: receiving routine name, program number and port number of the receiver Sender: client handle, program number and port number of the receiver Message sending: message name, medium variable value, client handle Message sending: message name, sending host name At this time, the following protocol is used between the client and server.

EVSReceiverCreated (program number, receiver number

EVSSenderCreated (program number, sender number, receiving host, receiving program)

EVSEventSent (program number, sender number, message name)

EVSEventReceiver (program number, receiver number, sending host, message name)

In Step 9, the debugging client maps the receiver and sender and the receiving message and sending message whenever the event is generated, and an interrelationship between events is configured, and is displayed on the event tracing window.

The event tracing window is provided with a report, from the debugging server, that the communication event occurred and a corresponding message or medium variable value.

The receiver and sender and the method for mapping the receiving message and sending message in Step S9 will be explained with reference to FIG. 3.

First, in Step S100, the event object is generated, and in Step S101, the event type is judged.

As a result of the judgement in Step S101, if the event type is the sender generation, the receiver is searched in Step S102, and when searching the receiver in Step S102, the receiver is mapped in Step S103, and when the receiver is not searched, such truth is added to the sender queuing list generated in Step S104.

As a result of the judgement in Step S101, the event type is the receiver generation, the sender is searched from the sender queuing list from Step S105.

As a result of the judgement in Step S101, the event type is a message receiving, the sender is searched in Step S106, and when the sender is searched, the sender is mapped in Step S107, and when the sender is not searched, the message receiving generated in Step S8 is added to the receiver queuing list.

As a result of the judgement of Step S101, when the event type is a message sending, the receiver is searched from the sender queuing list in Step S109.

As described above, in the present invention, it is possible to monitor the communication between programs. In addition, the following effects may be provided. First, it is possible to stop the program execution at a position where a predetermined communication event occurs. Second, the debugging operation is implemented at a receiving time with respect to the program of the communication event. Third, in the case of the communication message or RPC, the value of the medium variable may be confirmed. Fourth, it is possible to more effectively check the program logic related with the communication by performing a debugging operation with respect to the communication program in order to check the sequence of the communication event and interrelationship.

There are a couple of RPC products such as Netwise RPC and DCE RPC platform. Even though the system of the present invention is implemented based on SUN RPC, the model proposed in this invention is valid with any type of RPC applications.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A communication event/message tracing method for an RPC-based distribution processing program includes the steps of:

a first step in which a program and event list to be traced on an event tracing window of a debugging client is registered by a user and a debugging client reports the start of the event tracing to the debugging server in which a corresponding program exists;

a second step in which the debugging servers reports a break point setting instruction to an event-related RPC library function to the rear debugger in accordance with the report in the first step;

a third step in which the rear debugger sets a break point with respect to the RPC library function of the program in accordance with the instruction of the second step and the result is reported to the debugging server;

a fourth step in which the debugging server reports to the debugging client that the event tracing operation is ready in accordance with the report of the third step;

a fifth step in which the debugging client reports to the rear debugger through the debugging server so that the debugging client performs all programs related to the event tracing program in accordance with the report of the fourth step, and the rear debugger performs the program;

a sixth step in which the ready debugger judges whether the rear debugger reaches the position where the break point is set during the operation of the program of the fifth step;

a seventh step in which the fifth step is repeatedly performed when the break point does not reach the set position as a result of the judgement of the sixth step and the program is stopped at a corresponding position when the same reaches the set position, and the result thereof is reported to the debugging client through the debugging server;

an eighth step in which the debugging client compares the break point with the event list in accordance with the report of the seventh step and judges whether the event is generated; and a ninth step in which the fifth step is repeatedly performed when the event is not generated as a result of the judgement of the eighth step and a receiving message and sending message of the sender and receiver are mapped when the event is generated, and the generation of the event is displayed on the event tracing window.

2. The method of claim 1, wherein the debugging client in said ninth step includes:

a receiver and sender;

a sending object queuing list for storing the sender before the receiver is generated for mapping a receiving and sending message; and a receiving object queuing list for storing a receiving message arrived before the sending.

3. The method of claim 1, wherein said mapping method of a debugging client in said ninth step includes:

a first step in which an event object is generated, and an event type is judged;

a second step in which the receiver is searched when the event type is a sender generation as a result of the judgement of the first step;

a third step in which the receiver is mapped when the receiver is being searched in the second step, and the sender generated in the first step is added to the sender queuing list;

a fourth step in which the sender is searched from the sender queuing list when the event type is the receiver generation as a result of the judgement of the first step;

a fifth step in which the sender is searched when the event type is the message receiving as a result of the judgement of the first step;

a sixth step in which the sending and receiving are mapped when the sender is not searched in the fifth step, and the message receiving generated in the first step is added to the receiver queuing list when the sender is not searched; and a seventh step in which the receiver is searched from the sender queuing list when the event type is the message sending as a result of the judgement of the first step.

* * * * *